(12) United States Patent
Ichinose

(10) Patent No.: US 10,954,701 B2
(45) Date of Patent: Mar. 23, 2021

(54) MOTOR VEHICLE DOOR LOCK DEVICE

(71) Applicant: Mitsui Kinzoku Act Corporation, Yokohama (JP)

(72) Inventor: Mikio Ichinose, Yokohama (JP)

(73) Assignee: Mitsui Kinzoku Act Corporation, Kanagawa (JP)

( * ) Notice: Subject to any disclaimer, the term of this patent is extended or adjusted under 35 U.S.C. 154(b) by 636 days.

(21) Appl. No.: 15/140,274

(22) Filed: Apr. 27, 2016

(65) Prior Publication Data

US 2016/0325711 A1 Nov. 10, 2016

(30) Foreign Application Priority Data

May 8, 2015 (JP) ................................ JP2015-95947

(51) Int. Cl.
*E05B 85/04* (2014.01)
*E05B 81/06* (2014.01)
(Continued)

(52) U.S. Cl.
CPC ............ *E05B 85/045* (2013.01); *E05B 77/32* (2013.01); *E05B 81/06* (2013.01); *E05B 81/14* (2013.01);
(Continued)

(58) Field of Classification Search
CPC .......... E05B 81/64; E05B 81/56; E05B 81/68; E05B 81/70; E05B 81/72; E05B 81/74;
(Continued)

(56) References Cited

U.S. PATENT DOCUMENTS 6,168,215 B1 * 1/2001 Kodama ................. E05B 81/06
292/201
6,556,125 B1 * 4/2003 Rohrl ................. G07C 9/00309
340/5.62
(Continued)

FOREIGN PATENT DOCUMENTS

JP 4196617 B2 12/2004
JP 2009275363 A 11/2009
(Continued)

OTHER PUBLICATIONS

Office Action from Japan Patent Office, for corresponding Japanese Patent Application No. 2015-95947, dated Oct. 30, 2018, 3 pages.
(Continued)

*Primary Examiner* — Carlos Lugo
*Assistant Examiner* — Faria F Ahmad
(74) *Attorney, Agent, or Firm* — Klarquist Sparkman, LLP

(57) ABSTRACT

A motor vehicle door lock device comprises a locking mechanism, a locking motor, an electric release mechanism, an opening lever, and an outside handle. An ECU includes an authenticating portion. When the authenticating portion authenticates a signal from a transmitter and the locking mechanism starts switching from a locking state to an unlocking state by the locking motor, ECU controls a releasing motor so that the electric release mechanism is actuated because a switch detects door-opening action of the outside handle. The locking mechanism is switched to the unlocking state without contacting the opening lever from a direction where the opening lever cannot be actuated. A locked door can be opened with the outside handle at a single action and prevents a panic.

2 Claims, 11 Drawing Sheets

(51) Int. Cl.

| | |
|---|---|
| *E05B 85/00* | (2014.01) |
| *E05B 81/76* | (2014.01) |
| *E05B 81/64* | (2014.01) |
| *E05B 81/14* | (2014.01) |
| *E05B 81/16* | (2014.01) |
| *E05B 77/32* | (2014.01) |
| *E05B 81/34* | (2014.01) |
| *B60R 25/24* | (2013.01) |
| *E05B 77/48* | (2014.01) |
| *E05B 81/36* | (2014.01) |

(52) U.S. Cl.
CPC ............. *E05B 81/16* (2013.01); *E05B 81/64* (2013.01); *E05B 81/76* (2013.01); *E05B 85/01* (2013.01); *B60R 25/246* (2013.01); *E05B 77/48* (2013.01); *E05B 81/34* (2013.01); *E05B 81/36* (2013.01); *Y10S 292/23* (2013.01); *Y10T 292/0908* (2015.04); *Y10T 292/108* (2015.04); *Y10T 292/1082* (2015.04); *Y10T 292/1092* (2015.04)

(58) Field of Classification Search
CPC ........ E05B 81/77; E05B 81/78; E05B 85/045; E05B 77/32; E05B 81/06; E05B 81/14; E05B 81/16; E05B 81/76; E05B 85/01; E05B 77/48; E05B 81/34; E05B 81/36; Y10T 292/0908; Y10T 292/108; Y10T 292/1082; Y10T 292/1092; Y10S 292/23
USPC .................. 292/200, 201, 210, 216, DIG. 23
See application file for complete search history.

(56) References Cited

U.S. PATENT DOCUMENTS

| | | | | |
|---|---|---|---|---|
| 6,811,118 | B2* | 11/2004 | Collet | B64C 25/26 244/102 A |
| 8,009,023 | B2* | 8/2011 | Bergerhoff | B60R 25/24 340/10.41 |
| 8,256,805 | B2* | 9/2012 | Ishiguro | E05B 77/26 292/201 |
| 8,330,571 | B2* | 12/2012 | Yamaguchi | B60R 25/04 340/426.36 |
| 8,442,728 | B2* | 5/2013 | Wagenhuber | B60R 25/2045 340/5.72 |
| 8,701,353 | B2* | 4/2014 | Patel | E05B 85/107 49/503 |
| 9,037,313 | B2* | 5/2015 | Inoue | G07C 9/00309 141/350 |
| 9,580,942 | B2* | 2/2017 | Sobecki | E05B 85/103 |
| 9,903,142 | B2* | 2/2018 | Van Wiemeersch | E05B 81/76 |
| 9,932,761 | B2* | 4/2018 | Hamada | E05B 85/20 |
| 9,957,737 | B2* | 5/2018 | Patel | E05B 81/76 |
| 10,055,916 | B1* | 8/2018 | Helligrath | G07C 9/00182 |
| 2004/0075532 | A1* | 4/2004 | Ueda | E05B 77/48 340/5.72 |
| 2004/0177478 | A1* | 9/2004 | Louvel | E05B 81/78 16/430 |
| 2005/0057047 | A1* | 3/2005 | Kachouh | E05B 81/14 292/201 |
| 2005/0057408 | A1* | 3/2005 | Asakura | B60R 25/245 343/711 |
| 2005/0099263 | A1* | 5/2005 | Ikeda | B60R 25/24 340/5.62 |
| 2006/0232378 | A1* | 10/2006 | Ogino | B60R 25/246 340/5.62 |
| 2008/0203737 | A1* | 8/2008 | Tomaszewski | E05B 77/26 292/216 |
| 2009/0160211 | A1* | 6/2009 | Krishnan | B60J 5/04 296/146.4 |
| 2010/0007463 | A1* | 1/2010 | Dingman | B60Q 1/2669 340/5.72 |
| 2010/0019510 | A1* | 1/2010 | Ieda | E05B 81/78 292/173 |
| 2010/0187838 | A1* | 7/2010 | Ieda | B60R 25/00 292/336.3 |
| 2010/0192329 | A1* | 8/2010 | Ieda | B60R 25/246 16/421 |
| 2010/0214112 | A1* | 8/2010 | Ishihara | B60R 25/246 340/686.1 |
| 2010/0237635 | A1* | 9/2010 | Ieda | E05B 81/78 292/336.3 |
| 2010/0264940 | A1* | 10/2010 | Tsuchida | E05B 81/76 324/679 |
| 2011/0148575 | A1* | 6/2011 | Sobecki | E05B 85/103 340/5.64 |
| 2011/0154740 | A1 | 6/2011 | Matsumoto et al. | |
| 2011/0260831 | A1* | 10/2011 | Ieda | B60R 25/246 340/5.64 |
| 2012/0119524 | A1* | 5/2012 | Bingle | E05B 81/28 292/336.3 |
| 2013/0158744 | A1* | 6/2013 | Inoue | G07C 9/00309 701/2 |
| 2014/0000167 | A1* | 1/2014 | Patel | E05B 81/34 49/32 |
| 2015/0218857 | A1* | 8/2015 | Hamada | E05B 85/20 292/194 |
| 2016/0017645 | A1* | 1/2016 | Tomaszewski | E05B 77/26 292/240 |
| 2016/0186468 | A1* | 6/2016 | Ilea | E05B 79/04 292/201 |
| 2016/0189460 | A1* | 6/2016 | Watanabe | E05B 81/76 700/275 |
| 2016/0189539 | A1* | 6/2016 | Lin | G08C 23/04 398/108 |
| 2016/0325711 | A1* | 11/2016 | Ichinose | E05B 81/06 |
| 2017/0074000 | A1* | 3/2017 | Banvait | B60R 25/01 |
| 2017/0107746 | A1* | 4/2017 | Liu | B60R 25/24 |
| 2017/0297531 | A1* | 10/2017 | Sakamoto | B60R 25/24 |
| 2017/0350170 | A1* | 12/2017 | Cetnar | E05B 77/26 |
| 2018/0038137 | A1* | 2/2018 | Damboiu | E05B 77/26 |
| 2018/0100332 | A1* | 4/2018 | Brombach | E05F 15/73 |
| 2018/0218552 | A1* | 8/2018 | Helligrath | G07C 9/00111 |

FOREIGN PATENT DOCUMENTS

| | | |
|---|---|---|
| JP | 20095275427 A | 11/2009 |
| JP | 2011-132771 | 7/2011 |

OTHER PUBLICATIONS

Office Action from Japanese Patent Office, for corresponding Japanese Patent Application No. 2015-95497, dated May 28, 2019, 5 pages.

\* cited by examiner

FIG. 12

| | | | | | | |
|---|---|---|---|---|---|---|
| PORTABLE SWITCH SW5 | ○ | ○ | × | × | ○ | ○ |
| EXTERNAL SWITCH SW1 | ○ | ○ | × | × | ○ | × |
| INTERNAL SWITCH SW2 | ○ | ○ | ○ | × | ○ | ○ |
| OUTSIDE-HANDLE DETECTING SWITCH SW7 | × | ○ | × | × | × | × |
| TRANSMITTER SW4 | AUTHENTICATED (OUTSIDE) | | NOT AUTHENTICATED | | AUTHENTICATED (INSIDE) | |
| LOCKING-STATE DETECTING SWITCH SW6 | UNLOCK | LOCK | UNLOCK | LOCK | UNLOCK | LOCK |

○ : VALID
× : INVALID

MOTOR VEHICLE DOOR LOCK DEVICE

CROSS REFERENCE TO RELATED APPLICATION

This application claims the benefit of Japanese Patent Application No. 2015-95947, filed May 8, 2015, which is incorporated herein by reference.

FIELD

The present invention relates to a motor vehicle door lock device.

BACKGROUND

A motor vehicle door lock device in JP4196617B2 comprises an engagement mechanism that engages with a striker of a vehicle body to hold a door closed; a locking mechanism comprising mechanical elements that is switched to an unlocking state capable of releasing engagement of the engagement mechanism with an outside handle and a locking state incapable of releasing it; and a panic-avoiding structure capable of avoiding a panic in which the locking mechanism does not normally finish switching to the unlocking state by contacting a part of the locking mechanism to a lever for releasing engagement of the engagement mechanism from an action-incapable direction when the locking mechanism is unlocked simultaneously with or right before and after door-opening action of the outside handle.

However, the motor vehicle door lock device in JP4196617B2 involves disadvantage that in order to open a door in which the locking mechanism is locked, from the outside of a vehicle, it is necessary to unlock the locking mechanism and then to open the door with the outside handle. So the door cannot be opened swiftly.

Furthermore, when the panic occurs, door-opening action with the outside handle stops once and the locking mechanism is switched to the unlocking state. Then, the door is opened with the outside handle. So the door cannot be opened swiftly.

SUMMARY

In view of the disadvantages, it is an object of the present invention to provide a motor vehicle door lock device in which a locked door can be opened with an outside handle swiftly once.

It is another object of the present invention to provide a motor vehicle door lock device preventing a panic.

The foregoing and other objects, features, and advantages of the invention will become more apparent from the following detailed description, which proceeds with reference to the accompanying figures.

BRIEF DESCRIPTION OF THE DRAWINGS

FIG. 12 is a view showing "valid/invalid" of electric elements.

DETAILED DESCRIPTION

One embodiment of the present invention will be described with the drawings.

Figure 1:
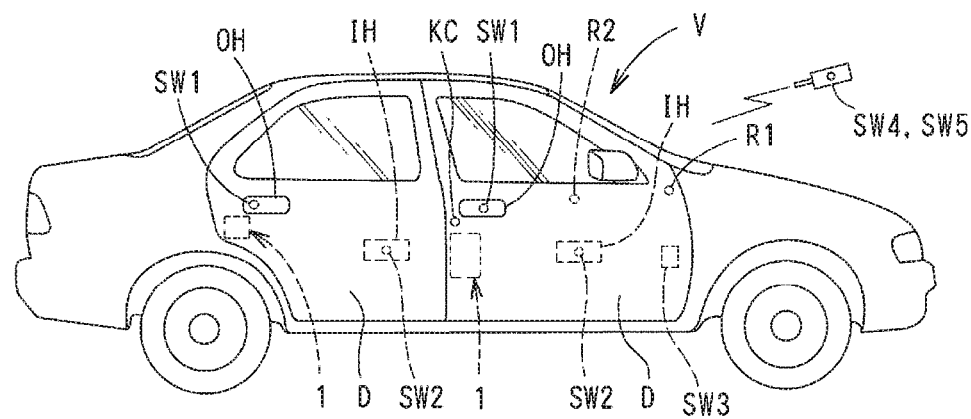
FIG. 1 is a side elevational view of a motor vehicle comprising a door lock device according to the present invention.

In FIG. 1, in each door D of a 4-door motor vehicle, there are provided a door lock device 1 for holding the door closed; a mechanically-operated outside handle OH; an electrically-operated external switch SW1; a mechanically-operated inside handle IH; an electrically-operated inside switch SW2; and a locking knob (not shown) for selectively switching a locking mechanism into locking or unlocking from the inside. In a front door of doors D, there is provided a key cylinder KC for switching the locking mechanism to a locking state and an unlocking state outside the vehicle.

In a place in which the user can operate at a driver's seat, such as the interior close to the driver's seat or on the inner side of the front door D, there is disposed an internal locking switch SW3 for switching locking/unlocking of the locking mechanism of all the doors D.

An external switch SW1 is disposed on the front surface or the back surface of an outside handle OH or close thereto. The internal switches SW1, SW2 are capacitive touch switches for detecting touch of user's finger, but are not limited thereto. A proxity switch for detecting part of a human body that approaches may be used.

The external switch SW1 is electrically controlled by an ECU or an electronic control unit in the motor vehicle V so that user's operation becomes valid when a normal user or a driver who bears a transmitter SW4 or an electronic key exclusively for use of motor vehicles comes within a predetermined area around the motor vehicle V and it is authenticated that the normal user approaches the motor vehicle V by matching an ID signal through wireless communication between the transmitter SW4 and outside receiver R1 disposed outside a vehicle body.

On the motor vehicle V, an inside receiver R2 inside the vehicle is disposed besides the outside receiver R1. The outside receiver R1 is capable of receiving a signal from the transmitter SW4 within the predetermined area around the vehicle, and the inside receiver R2 is capable of receiving a signal from the inside transmitter SW4.

The transmitter SW4 is disposed in a wireless-communication portable switch SW5 or exterior electric operation element carried by the user or is separately constructed from the portable switch SW5. The portable switch SW5 comprises an opening-switch portion operated when the door D is opened, and a locking/unlocking switch portion operated when the locking mechanism is switched. The opening-switch portion is assigned to each of the doors and the locking/unlocking switch portion is used for all the doors. Operation of the opening switch portion and locking/unlocking portion is validated if the ID signal from the transmitter SW4 is authenticated, and is invalidated if it is not authenticated.

Figure 2:
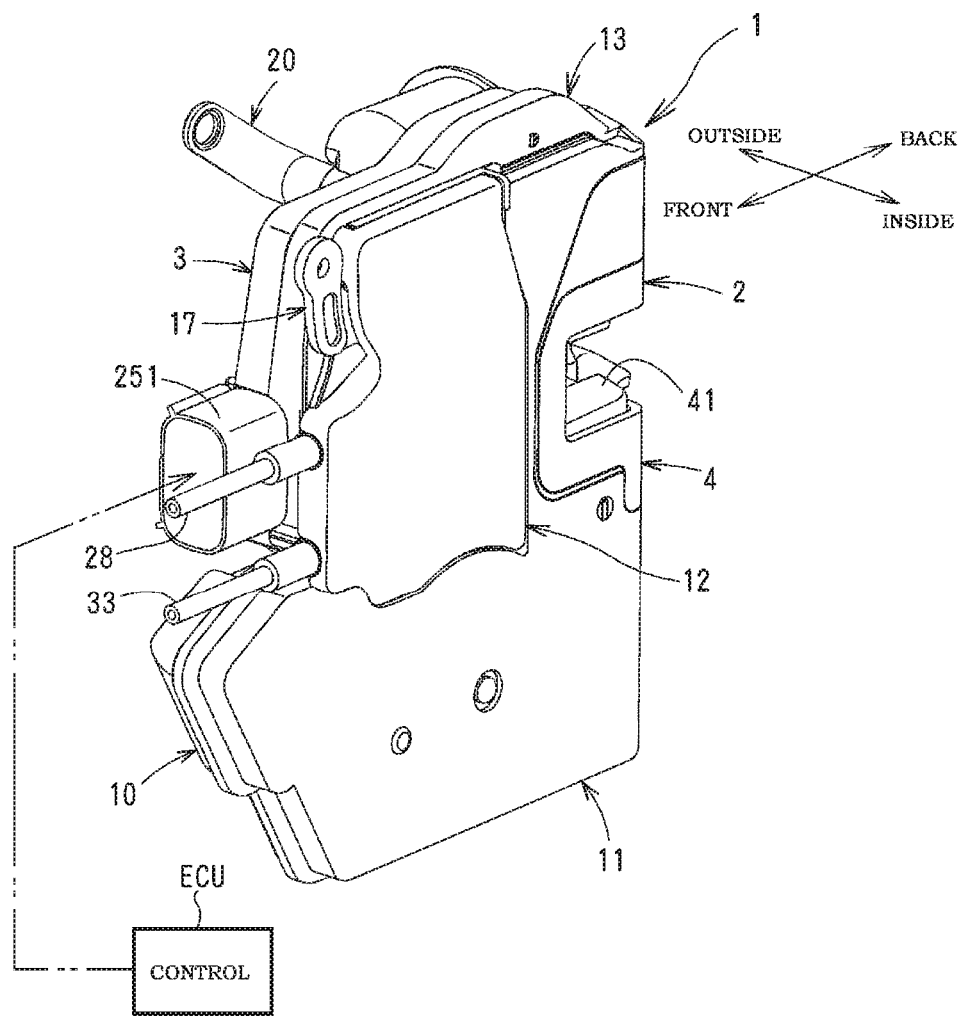
FIG. 2 is a perspective view of the door lock device.
Figure 3:
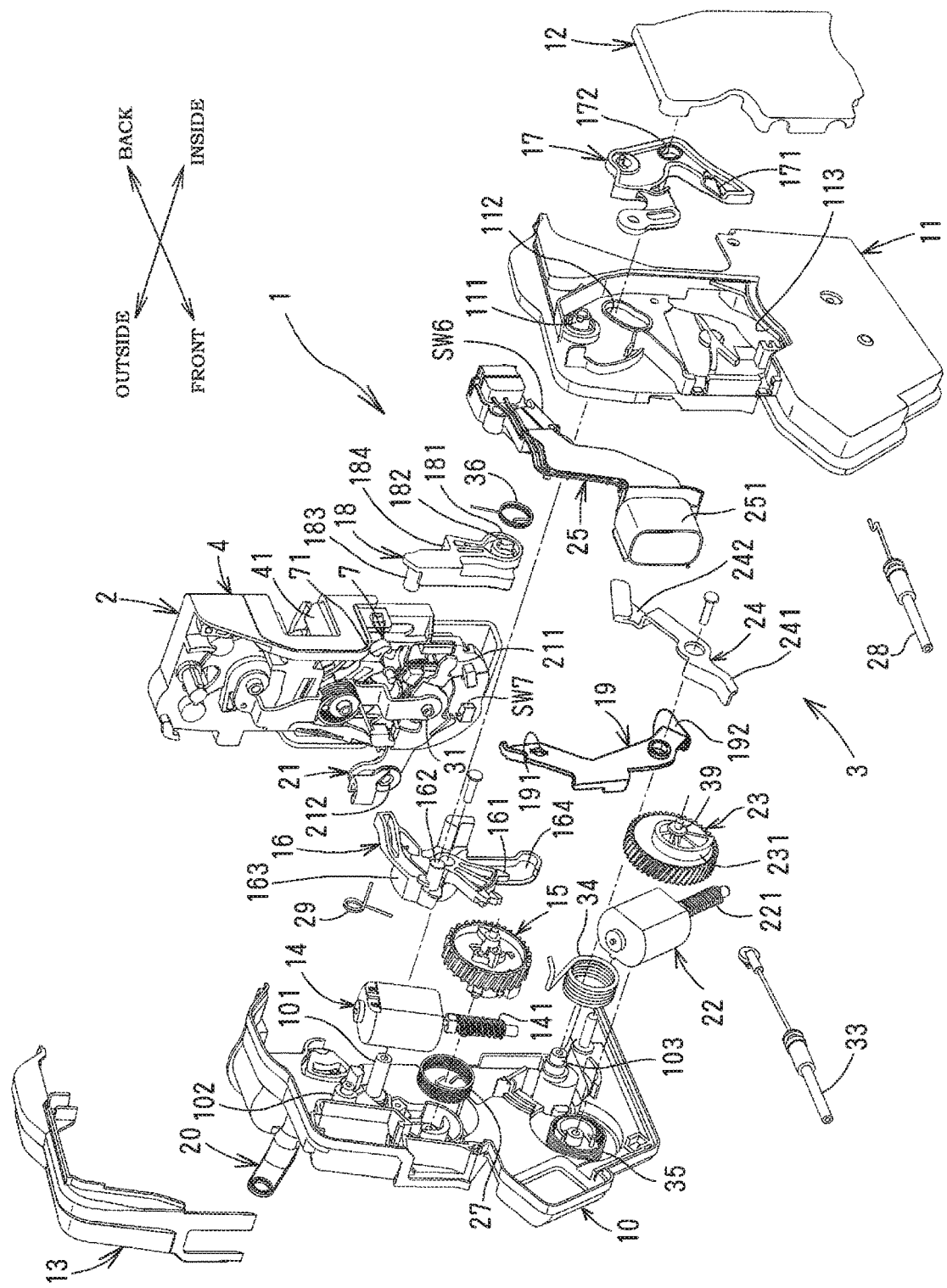
FIG. 3 is an exploded perspective view of the door lock device.
Figure 4:
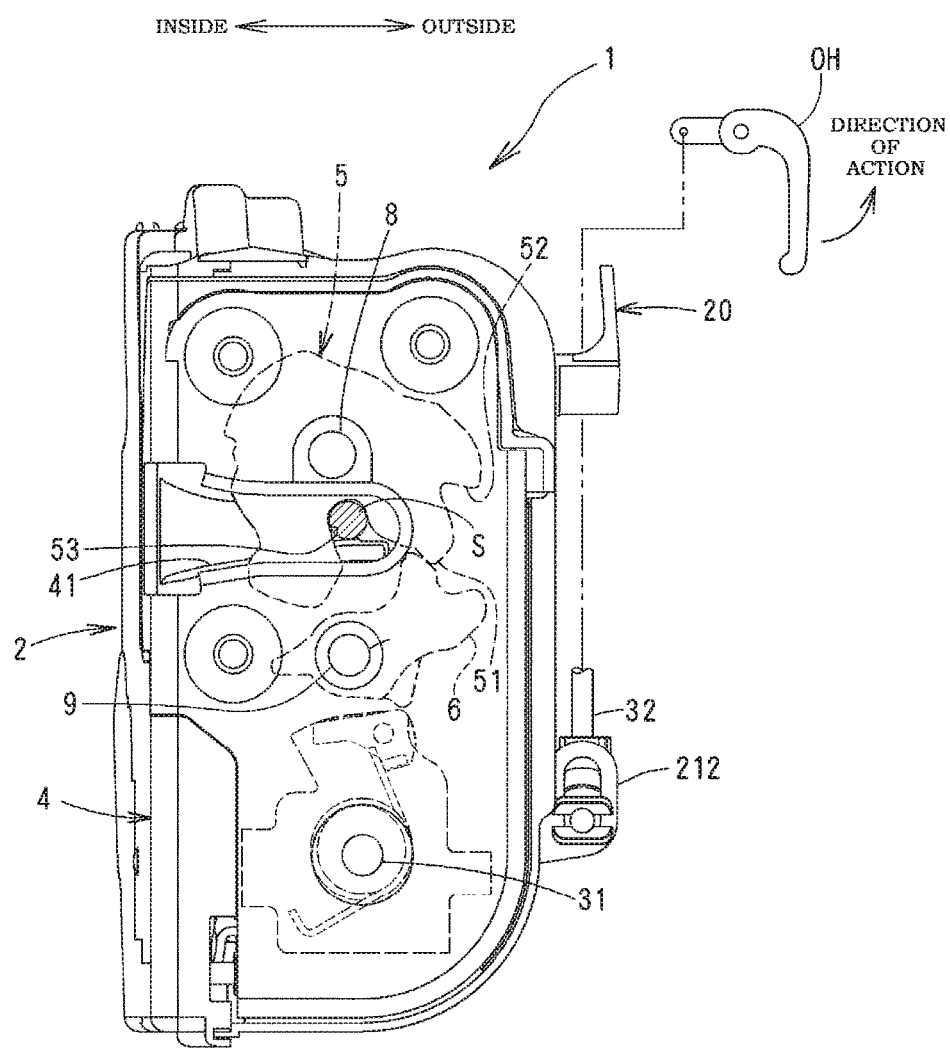
FIG. 4 is a rear elevational view of the door lock device.

FIG. 2 is a perspective view of the door lock device 1; FIG. 3 is an exploded perspective view of the door lock device 1; FIG. 4 is a back elevational view of the door lock device; and FIGS. 5 to 10 are views showing operation.

Directions as below are shown in a state where the door lock device 1 is installed in the door.

The door lock device comprises an engagement unit 2 having an engagement mechanism that engages with a striker of the vehicle body to hold the door D closed; and an operation unit 3 having a locking mechanism that comprises mechanical elements, such as a lever and a link, which are capable of turning the door D to a locked state or an unlocked state.

In FIG. 4, the engagement unit 2 mainly comprises a body 4 fixed to the rear end in the door D with a plurality of bolts (not shown); the engagement mechanism (with no reference) that comprises a latch 5 engagable with the striker S fixed on the vehicle body and a ratchet 6 engagable with the latch 5; and an opening lever 7 that disengages the ratchet 6 from the latch 4 in FIG. 3.

The latch 5 is pivotally mounted in the body 4 via a latch shaft 8 that lies longitudinally of the vehicle, and comprises a full-latch engagement portion 51 and a half-latch engagement portion 52 that engage with the ratchet 6; and an engagement groove 53 that engages with the striker S which comes in a striker-entering groove 41 of the body 4.

By closing the door D, the latch 5 turns at a predetermined angle counterclockwise against force of the spring (not shown) from an open position where the latch 5 turns at about 90 degrees clockwise from FIG. 4 to hold the door D open without engagement with the striker S, to the full-latch position in FIG. 4 corresponding to a fully-closed state where the striker S completely engages with the engagement groove 53 via the half-latch position where the engagement groove 53 slightly engages with the striker S which comes in the striker-entering groove 41 from the left to hold the door ajar. When the striker S gets out of the striker-entering groove 41 by opening the door D, the latch 5 turns reversely.

Under the striker-entering groove 41, the ratchet 6 is pivotally mounted in the body 4 via a ratchet shaft 9 which lies longitudinally of the vehicle and is biased with a spring (not shown) in an engagement direction or counterclockwise to engage with the full-latch engagement portion 51 or half-latch engagement portion 52 of the latch 5. The ratchet 6 engages with the full-latch engagement portion 51 to hold the door D closed completely and engages with the half-latch engagement portion 52 to hold the door D ajar.

In FIG. 3, the opening lever 7 is pivotally mounted on the front surface of the body 4 coaxially with the ratchet 6 on the front surface of the body 4 to rotate together with the ratchet 6. The opening lever 7 turns counterclockwise in FIG. 3 to disengage the ratchet 6 from the latch 5. At the end of the opening lever 7 extending inward of the vehicle, a releasable portion 71 is provided.

Then, the operation unit 3 will be described.

In FIG. 3, the operation unit 3 comprises a first L-shaped synthetic resin cover 10 fixed to the body 4 to cover the front surface of the body 4; a second synthetic resin cover 11 closing a side of the first cover 10 facing the inside of the vehicle; a synthetic-resin waterproof side cover 12 closing an upper part of the second cover 11 from the inside of the vehicle; a waterproof top cover 13 covering upper mating surfaces of the first cover 10 and the second cover 11; and an operation mechanism (without numeral) held within the housing.

The words "within the housing" stands for a storage space formed between the side of the first cover 10 almost perpendicular to the front surface of the body 4 and the side of the second cover 11 facing the side of the first cover 10.

Figure 5:
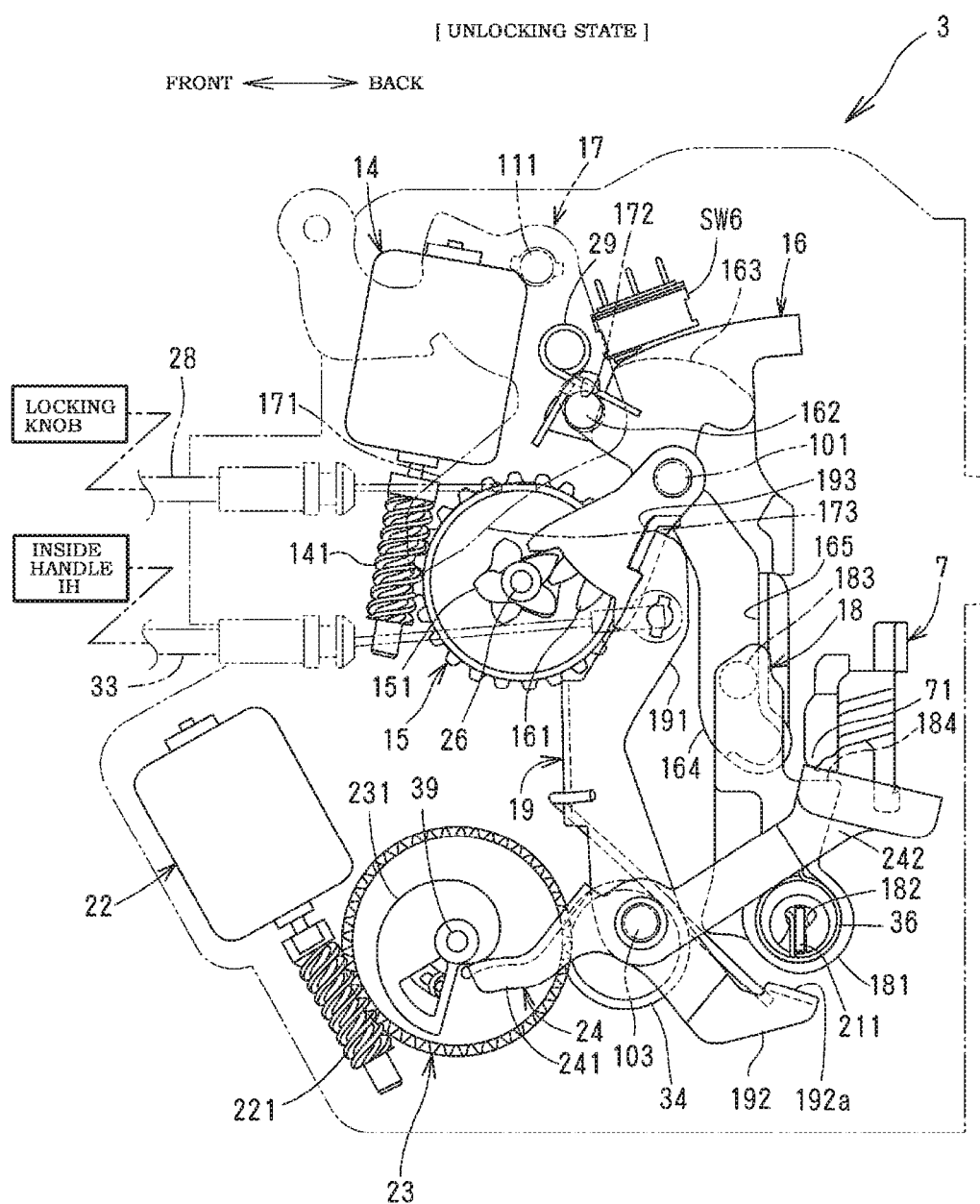
FIG. 5 is a side view of a main part in an unlocking state.

The operation mechanism comprises a locking motor 14; a locking worm wheel 15 rotatable normally and reversely with the locking motor 14; a locking lever 16 that moves between an unlocking position where door-opening operation of the outside handle OH is validated and a locking position where it is invalidated; an open link 18 movable with the locking lever 16 between the locking position and unlocking position; an inside lever 19 connected to the inside handle IH; a key lever 20 connected to the key cylinder KC; an outside lever 21 connected to the outside handle OH; a releasing motor 22; a releasing worm wheel 23 which can rotate with the releasing motor 22; an electric release lever 24 which pivots counterclockwise in FIG. 5 with the releasing worm wheel 23; and a distribution board 25 which supports wires electrically connected to the locking motor 14, releasing motor and various switches. In a storage space between the second cover 11 and the waterproof side cover 12, a knob lever 17 connected to a manually-operating locking knob on the door inside the vehicle is provided. Without the locking knob, the knob lever 17 is not required.

The locking mechanism in this embodiment comprises the locking worm wheel 15, the locking lever 16 and the open link 18.

"Unlocking state" in the following description means that the locking lever 16, knob lever 17 and open link 18 are placed in the unlocking position respectively, and "locking state" means that the locking lever 16, knob lever 17 and open link 18 are placed in the locking positions respectively. The locking mechanism is not limited to this embodiment, but may be varied.

The electrically releasing mechanism comprises the releasing worm wheel 23 and the electric release lever 24.

The distribution board 25 is formed together with a coupler 251 connected to an external connector (not shown) for external wires connected to a battery (not shown) and ECU. On the side facing the outside of the vehicle, wires for supplying power into the housing and sending various signals are provided. Wires on the distribution board 25 are coupled to terminals of the locking motor 14 and releasing motor 22 and an external connector coupled to the coupler 251 so that the locking motor 14 and releasing motor 22 may be controlled by ECU.

In FIG. 5, the locking worm wheel 15 is pivotally mounted in the housing via a shaft 26 and meshes with the worm 141 fixed on a rotation shaft of the locking motor 14. Thus, the locking worm wheel 15 rotates clockwise or counterclockwise from a neutral position in FIG. 5 against a force of a spring 27 wound on the shaft 26 with rotation of the locking motor 14. When the locking motor 14 stops rotating, the locking worm wheel 15 returns to the neutral position from a position where it rotates by the spring 27.

The knob lever 17 is pivotally mounted to the side of the second cover 11 via a shaft 111 of the second cover 11 and a connecting arm 171 which extends downward is connected to the manually-operating locking knob via a connecting cable 28 that comprises a Bowden cable. Hence, by unlocking and locking the locking knob, the knob lever 17 rotates to the unlocking position in FIG. 5 and the locking position in FIG. 6 where it rotates at a predetermined angle counterclockwise from the unlocking position. Motion of the locking knob is transmitted to the locking lever 16 and open link 18 via the knob lever 17 as mentioned later. Without the locking knob, the connecting member 28 is not required.

After the knob lever 17 is connected to the second cover 11, the waterproof side cover 12 is fixed on the outer side of the second cover 11. Thus, the outer side of the second cover 11 including an area where the knob lever 17 is provided is partially closed, preventing rain water from coming into the housing.

The locking lever 16 is pivotally mounted in the housing via a shaft 101 which is disposed on the inner side of the first cover 10 and projects toward the inside of the vehicle. Teeth 161 on the lower front of the locking lever 16 mesh with teeth 151 of the locking worm wheel 15. The upper part of the locking lever 16 is coupled to the key lever 20, and a coupling projection 162 is coupled in a coupling hole 172 of the knob lever 17 through an arcuate hole 112 of the second cover 11. The locking lever 16 has an arm 164 having a guide wall 165 which extends downward from a center of the locking lever 16.

Figure 6:
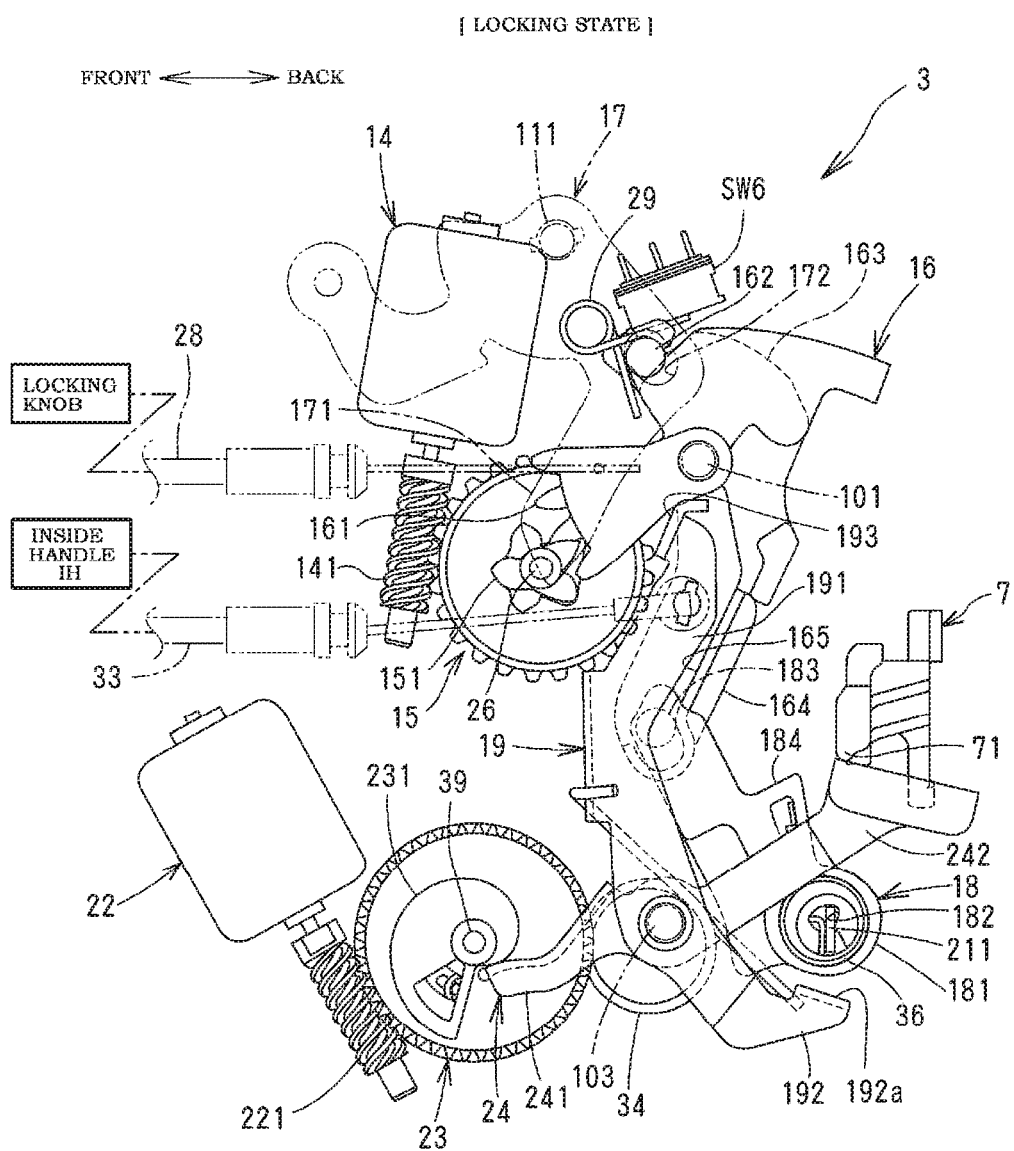
FIG. 6 is a side view of the main part in a locking state.
Figure 7:
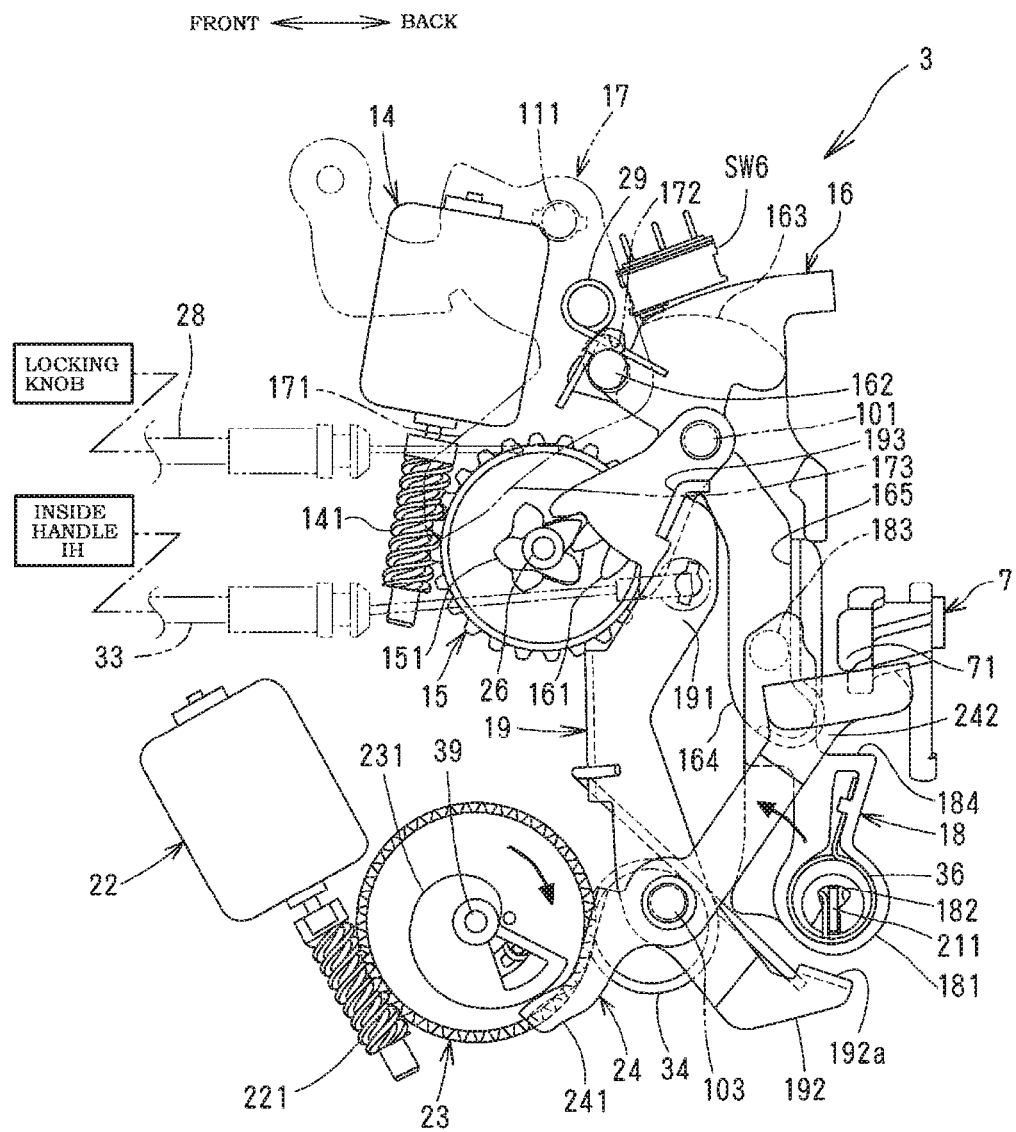
FIG. 7 is a side view of the main part that is electrically released in the unlocking state.
Figure 8:
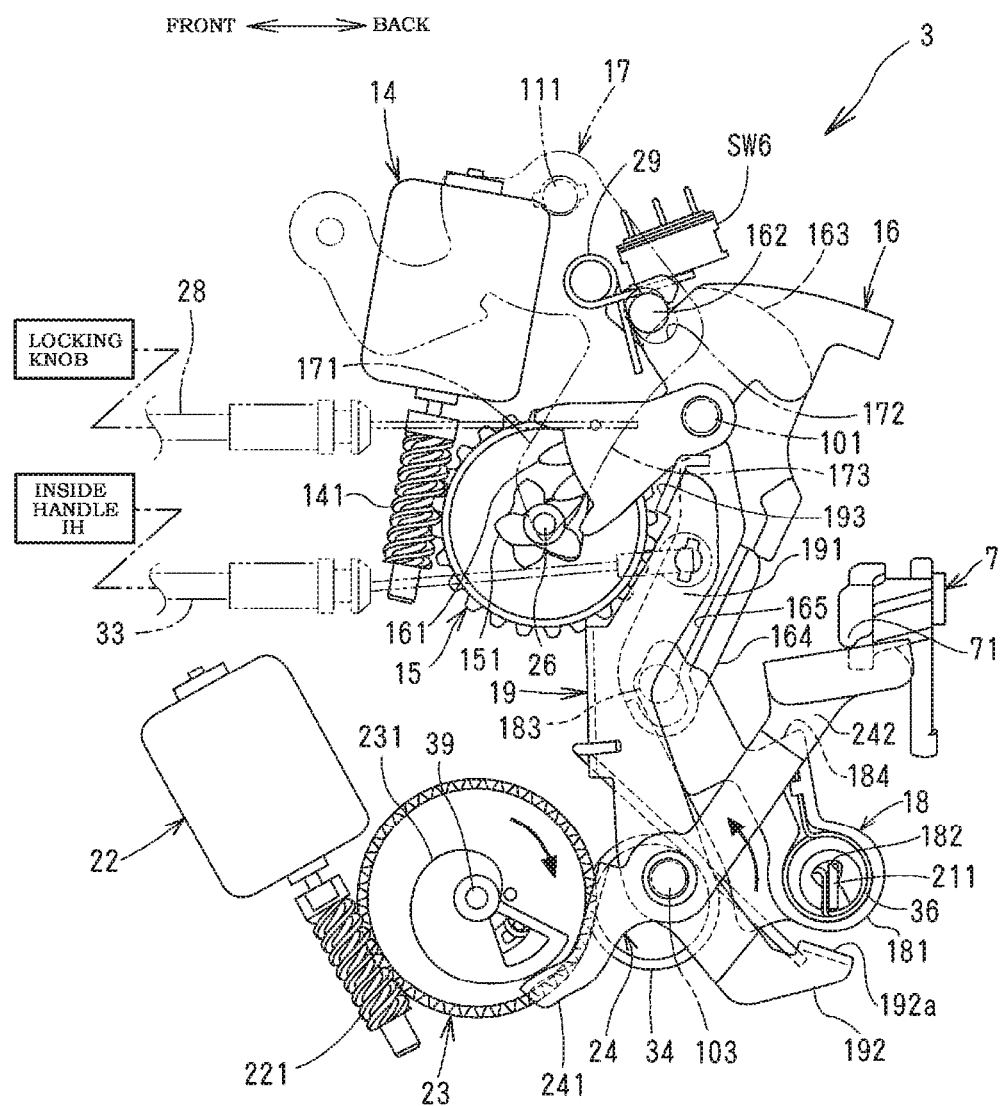
FIG. 8 is a side view of the main part that is electrically released in the locking state.

Turning the key lever 20 with the key cylinder KC, turning the knob lever 17 with the locking knob and turning the locking worm wheel 15 with the locking motor 14 make the locking lever 16 turn from the unlocking position in FIG. 5 to the locking position in FIG. 6 to which the locking lever 16 turns clockwise from the unlocking position at a predetermined angle. The locking lever 16 is elastically held in the unlocking position and the locking position respectively by elastically holding force of the holding member 29. When the locking worm wheel 15 is in the neutral position, the teeth 161 of the locking lever 16 do not mesh with the teeth 151 of the locking worm wheel 16. Hence, turning the locking lever 16 with the locking knob and the key cylinder KC is not transmitted to the locking worm wheel 15.

The holding member 29 comprises a torsion spring a coil of which is held on a cylindrical support 102 of the inner side of the first cover 10 in FIG. 3. The coupling projection 162 of the locking lever 16 is held between arms of the torsion spring. When the locking lever 16 turns from the unlocking position (or the locking position) to the locking position (or the unlocking position), a force by the spring is changed from an unlocking direction (or a locking direction) to a locking direction (or an unlocking direction) across a middle position between the unlocking position and the locking position.

The locking lever 16 stops at the unlocking position and the locking position by contacting a rubber stopper (not shown) fixed on the inner side of the first cover 10, to part of the locking lever 16.

A cam surface 163 is formed on the top of the locking lever 16, and comes in contact with a detecting part of a lock-detecting switch SW6 on the distribution board 25. When the locking lever 16 is at the unlocking position, the detecting part of the lock-detecting switch SW6 comes in contact with the cam surface 163 in FIG. 5 to cause the switch SW6 to generate an unlocking-state signal, and, when the locking lever 16 is in the locking position, to cause the switch SW6 to generate a locking-state signal by going the detecting part off the cam surface 163. The generated signal is transmitted to ECU through the wires from the distribution board 25.

When the locking lever 16 moves from the locking position in the unlocking direction at a predetermined distance, the cam surface 163 comes in contact with the detecting part of the locking-state detecting switch SW6. Hence, when the locking lever 16 moves from the locking position to a predetermined position which is in the middle between the locking position and the unlocking position, the locking-state detecting switch SW6 generates the locking-state signal.

The open link 18 has a circular coupling hole 182 in a lower pivoting portion 181. A flat coupling portion 211 that faces the inside of the vehicle is put in the coupling hole 182 and coupled to pivot at a predetermined angle. An upper coupling projection 183 is coupled to the arm 164 of the locking lever 16 as described later. Thus, with motion of the locking lever 16 to the unlocking and locking positions, the open link 18 turns to the unlocking position in FIG. 5 around the coupling portion 211 of the outside lever 21 and to the locking position in FIG. 6 to which it turns counterclockwise from the unlocking position at a predetermined angle.

In the middle, the open link 18 has a releasing portion 184 which can come in contact with a releasable portion 71 of the opening lever 7 upward. A torsion spring 36 is disposed in the rotary portion 181 of the open link 18.

The torsion spring 36 engages with the open link 18 at one end and with the coupling portion 211 of the outside lever 21 at the other end, so that a force in an unlocking direction clockwise in FIG. 5 is always applied to the open link 18 around the coupling portion 211 of the outside lever 21. The force of the torsion spring 36 is set to be smaller than a force for elastically holding the locking lever 16 of the holding member 29 in the locking position.

The coupling projection 183 of the open link 18 can slide vertically along the arm 164 of the locking lever 16 and is coupled to the arm 164 of the locking lever 16 so that the coupling projection 183 can come in contact with the guide wall 165 only when the locking lever 16 turns in the locking direction or counterclockwise in FIG. 5.

In the unlocking state in FIG. 5, in order to turn the locking lever 16 to the locking position, the guide wall 165 of the locking lever 16 comes in contact with the coupling projection 183 of the open link 18, so that the open link 18 turns from the unlocking position to the locking position in FIG. 6. In the locking state in FIG. 6, in order to turn the locking lever 16 to the unlocking position, the open link 18 is turned from the locking position to the unlocking position in FIG. 6 by the force of the torsion spring with turning of the locking lever 16 without depending on the contact of the guide wall 165 to the coupling projection 183.

In the locking state in FIG. 6, the force of the torsion spring 36 is applied to the locking lever 16 in the unlocking direction clockwise, but is smaller than elastic force for holding the locking lever 16 in the locking position with the holding member 29. So the locking lever 16 and open link 18 do not turn to the unlocking position by the force of the torsion spring 36.

The outside lever 21 is pivotally mounted to the lower front part of the body 4 to turn vertically, and the coupling portion 211 near the inside of the vehicle is coupled to the open link 18 as mentioned above. The coupling portion 212 near the outside of the vehicle is coupled to the outside handle OH via a vertical connecting member 32 in FIG. 4. By opening the door with the outside handle OH as shown by an arrow in FIG. 4, the outside lever 21 turns at a predetermined angle in a releasing direction counterclockwise in FIG. 3 against force of the spring (not shown), so that the open link 18 is moved upward for releasing.

The releasing worm wheel 23 like a disc is pivotally mounted in the housing via a shaft 39 and meshes with a worm 221 fixed on a rotary shaft of the releasing motor 22. With the releasing motor 22, the worm wheel 23 turns clockwise at a predetermined angle from a set position in FIG. 5 against the force of the spring 35 wound on the shaft 39 in FIG. 3 to a position in FIG. 7 in which the releasing motor 22 stops. Then, the worm wheel 23 is moved back by the spring 35 again to the set position from the rotated position. On the releasing worm wheel 23, there is provided a cam surface 231 which comprises an involute curve where a distance from a center to an outer circumference gradually increases counterclockwise in FIG. 5.

The electric release lever 24 is pivotally mounted in the housing via a shaft 103 and comprises a first arm 241 which extends forward, can slide at the end on the cam surface 231 of the releasing worm wheel 23, extends backward and can come in contact with the releasable portion 71 of the opening lever 7 at the end.

In FIG. 5, when the releasing worm wheel 23 is in the set position, the end of the first arm 241 of the electric release lever 24 comes in contact with a smaller-diameter portion of the cam surface 231 of the releasing worm wheel 23. So the electric releasing lever 24 is held in the set position in FIG. 5. With the releasing motor 22, the releasing worm wheel 23 turns at a predetermined angle clockwise from the set position in FIG. 5 to the release position in FIG. 7. The end of the first arm 241 of the electric release lever 24 relatively slides on the cam surface 231 and moves to a larger-diameter portion of the cam surface 231. The electric release lever 24 turns to the releasing position in FIG. 7, and the end of the second arm 242 comes in contact with the releasable portion 71 of the opening lever 7 from below. The opening lever 7 disengages the ratchet 6 from the latch 5, so that the door D can be opened.

The inside lever 19 is pivotally mounted at the lower part in the housing via the shaft 103 via which the electric release lever 24 is pivotally mounted, and comprises a first arm 191 which extends upward and projects from an arcuate opening 113 of the second cover 11 in FIG. 3, a second arm 192 which extends obliquely backward and downward and an unlocking portion 193 which is formed at the top of the first arm 191 and which can come in contact with a lower part 173 of an arm 171 of the knob lever 17. The upper part of the first arm 191 is connected to the inside handle IH of the door D via a connecting member 33 such as a Bowden cable. Mechanical door-opening action with the inside handle IH moves the inside lever 19 from the set position in FIG. 5 counterclockwise against the force of the spring 34 wound on the shaft 103.

The second arm 192 has a contact portion 192a which can come in contact with a rotary portion 181 of the open link 18 from below when the inside lever 19 is moved for releasing.

Then, an electric circuit which includes ECU in this embodiment will be described.

Figure 11:
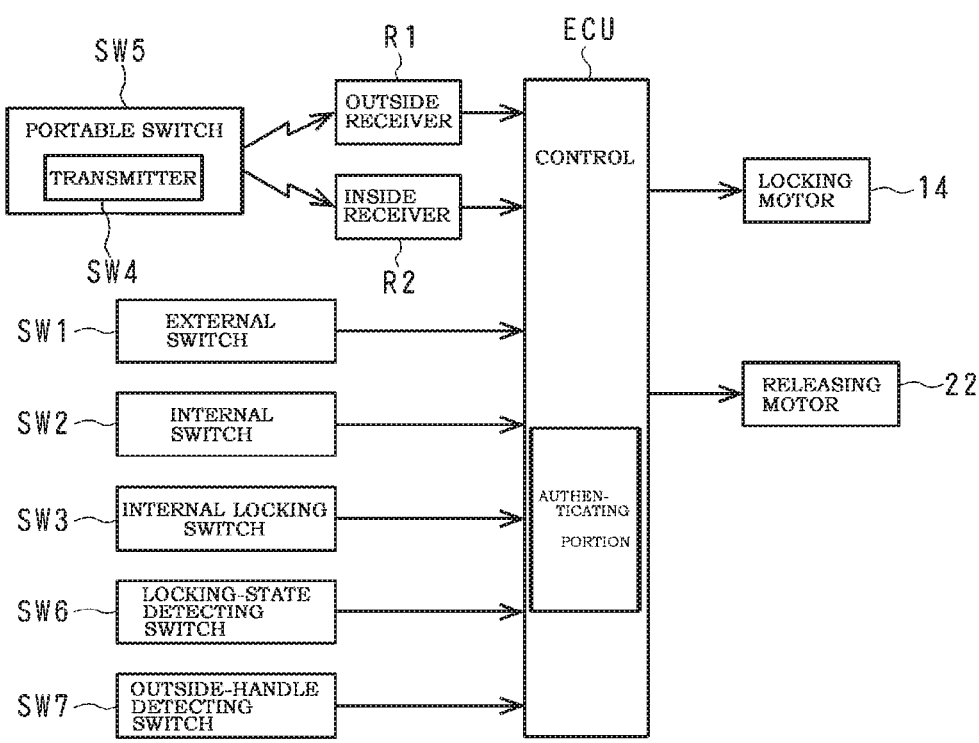
FIG. 11 is a block diagram showing a control circuit.

In FIG. 11, ECU comprises a built-in one chip CPU with ROM which stores a control program and RAM which acts as a working area of CPU and carries out a series of control processing. ECU includes an authenticating portion which checks an ID signal through wireless communication between the transmitter SW4 and receivers R1, R2. The authenticating portion may be disposed separately from ECU.

Input ports of ECU are electrically connected to the receivers R1, R2, external switch SW1 for each of the doors, internal switch SW2 for each of the doors, internal locking switch SW3, locking-state detecting switch SW6 and outside-handle detecting switch SW7, and each signal is fed therefrom. The locking motor 14 and releasing motor 22 are electrically connected to output ports respectively.

The internal locking switch SW3 is disposed inside the vehicle and transmits an unlocking signal during unlocking operation and a locking signal during locking operation to ECU. If ECU receives the unlocking signal, the locking motor 14 is controlled for unlocking so that the locking mechanisms in all the doors are switched to the unlocking state, and if it receives the locking signal, the locking motor 14 is controlled for locking so that the locking mechanisms in all the doors are switched to the locking state.

As mentioned above, when the locking lever 16 is in the unlocking position, the locking-state detecting switch SW6 comes in contact with the cam surface 163 and detect the unlocking state of the locking mechanism to transmit an unlocking-state signal to ECU. When the locking lever 16 is between the locking position and the predetermined position which is the middle between the unlocking position, the switch SW6 goes off the cam surface and detects the locking state of the locking mechanism to transmit the locking-state signal to ECU.

In FIG. 3, the outside-handle detecting switch SW7 is disposed under the front surface of the body 4 and comes in contact with part of the outside lever 21 when the outside lever 21 turns at a predetermined angle in a releasing direction by opening the door with the outside handle OH and detects that the outside handle opens the door to transmit a signal to ECU.

ECU selectively validates or invalidates a door-opening signal transmitted from the external switch SW1, the internal switch SW2, the portable switch SW5 and the outside-handle detecting switch SW7 depending on receipt of each signal transmitted from the outside receiver R1, the inside receiver R2 and the locking-state detecting switch SW6. ECU receives the door-opening signal of the validated switch and carries out releasing control of the releasing motor 22 of the door D to open.

ECU carries out switching control in FIG. 12.

In "transmitter SW4" in FIG. 12, "authentication (outside)" in "transmitter SW4" means that ID signal between the outside receiver R1 and the transmitter SW4 is authenticated when a user who bears the transmitter SW4 is within a predetermined area outside the vehicle, and "non-authentication" means that ID signal from the transmitter SW4 is not authenticated when the transmitter SW4 is out of the predetermined area outside the vehicle, or inside the vehicle. "Authentication (inside)" means that ID signal between the inside receiver R2 and the transmitter SW4 is authenticated when the transmitter SW4 is inside the vehicle or when the user is in the vehicle.

In FIG. 12, ECU carries out switching control.

In "authentication (outside)" of the transmitter SW4, door-opening action with the portable switch SW5, external switch SW1 and internal switch SW2 is always valid even if the locking-state detecting switch SW6 detects any one of the unlocking state and locking state. A door-opening signal by the outside-handle detecting switch SW7 is invalid if the locking-state detecting switch SW6 detects the unlocking state, and is valid if it detects the locking state.

On "non-authentication" state of the transmitter SW4, door-opening action with the internal switch SW2 is valid if the locking-state detecting switch SW6 detects an unlocking state. Except it, the door-opening action is invalid.

In "authentication (inside)" of the transmitter SW4, the door-opening action with the portable switch SW5 and internal switch SW2 is always valid regardless of detection of the locking-state detecting switch SW6. Action of the external switch SW1 is valid if the locking-state detecting switch SW6 detects an unlocking state, and is invalid if it does not detect an unlocking state. A door-opening signal of the outside-handle detecting switch SW7 is invalid even if the locking-state detecting switch SW6 detects any one of the unlocking state and locking state. Thus, when a user is inside the vehicle, a door is unlikely opened by someone unexpectedly from the outside if the locking members are in the locking state.

A main action of the door lock device will be described.

When an ID signal from the transmitter SW4 is not authenticated and the locking mechanism is in the locking state, the door is tried by the outside handle OH.

In the locking state in FIG. 6, the door is tried by the outside handle OH, and its action is transmitted to the outside lever 21. The open link 18 is moved upward from a set position. But the open link 18 crosses the front of the releasable portion 71 without physically contacting the releasable portion 71, and the opening lever 7 cannot be releasably actuated, so that the door D cannot be opened.

In this case, the outside-handle detecting switch SW7 detects releasing action of the outside lever 21, but an ID signal from the transmitter SW4 is not authenticated, so that the releasing motor 22 is not driven.

When a signal from the transmitter SW4 is authenticated and the locking mechanism is in an unlocking state, the door is tried by the outside handle OH.

In the unlocking state of the locking mechanism in FIG. 5, the door is tried by the outside handle OH. The door-opening action is transmitted to the outside lever 21 via the connecting member 32. The open link 18 coupled to the coupling portion 211 of the outside lever 21 is moved upward from the set position and the releasing portion 184 comes in contact with the releasable portion 71 of the opening lever 7 from below. Thus, the ratchet 6 disengages from the full-latch engagement portion 51 of the latch 2, so that the door D can be opened.

When the door is tried to open by the outside handle OH, the door D can be opened if the locking mechanism is in an unlocking state, even if ECU does not authenticate the ID signal from the transmitter SW4. In this case, the locking-state detecting switch SW6 detects the unlocking state, and the releasing motor 22 is not driven even if the outside-handle detecting switch SW7 detects the door-opening action of the outside handle OH.

When a signal from the outside transmitter SW4 is authenticated and the locking mechanism is in the locking state, the door is tried by the outside handle OH.

In the locking state in FIG. 6, the door is tried by the outside handle OH, and the action is transmitted to the outside lever 21 via the connecting member 32. The open link 18 is moved upward from the set position in FIG. 6, and the outside-handle detecting switch SW7 detects the door-opening action of the outside handle OH with motion of the outside lever 21. Thus, in FIG. 9, the open link 18 is moved upward while the releasing portion 184 does not come in contact with the releasable portion 71 of the opening lever 7. Meanwhile, the electric release lever 24 is moved with the releasing motor 22, and the end of the second arm 242 comes in contact with the releasable portion 71 of the opening lever 7 from below, and the opening lever 7 is moved.

Hence, even if the locking mechanism is in the locking state, the door D can be opened with the releasing motor 22 if ECU recognizes ID signal from the outside transmitter SW4, although the outside handle OH does not open the door mechanically.

When a signal from the outside transmitter SW4 is authenticated and the locking mechanism is in the locking state, the door is tried by the outside handle OH and is unlocked by the internal locking switch SW3, portable switch SW5 or locking knob simultaneously or right before and after the door-opening action by the outside handle OH.

In FIG. 6, the outside lever 21 is moved with door-opening action of the outside handle OH. The locking lever 16 turns from the locking position in an unlocking direction (counterclockwise in FIG. 6) by unlocking the locking motor 17 when the internal locking switch SW3 or portable switch SW 5 is unlocked, or by turning the knob lever 17 when the locking knob is unlocked. The open link 18 is moved upward with the outside lever 21 while the releasing portion 184 does not come in contact with the releasable portion 71 of the opening lever 7, and pivots from the locking position in an unlocking direction owing to motion of the locking lever 16 in the unlocking direction. The electric release lever 24 is moved by the releasing motor 22 based on detection of door-opening action of the outside handle OH with the outside-handle detecting switch SW7.

Figure 9:
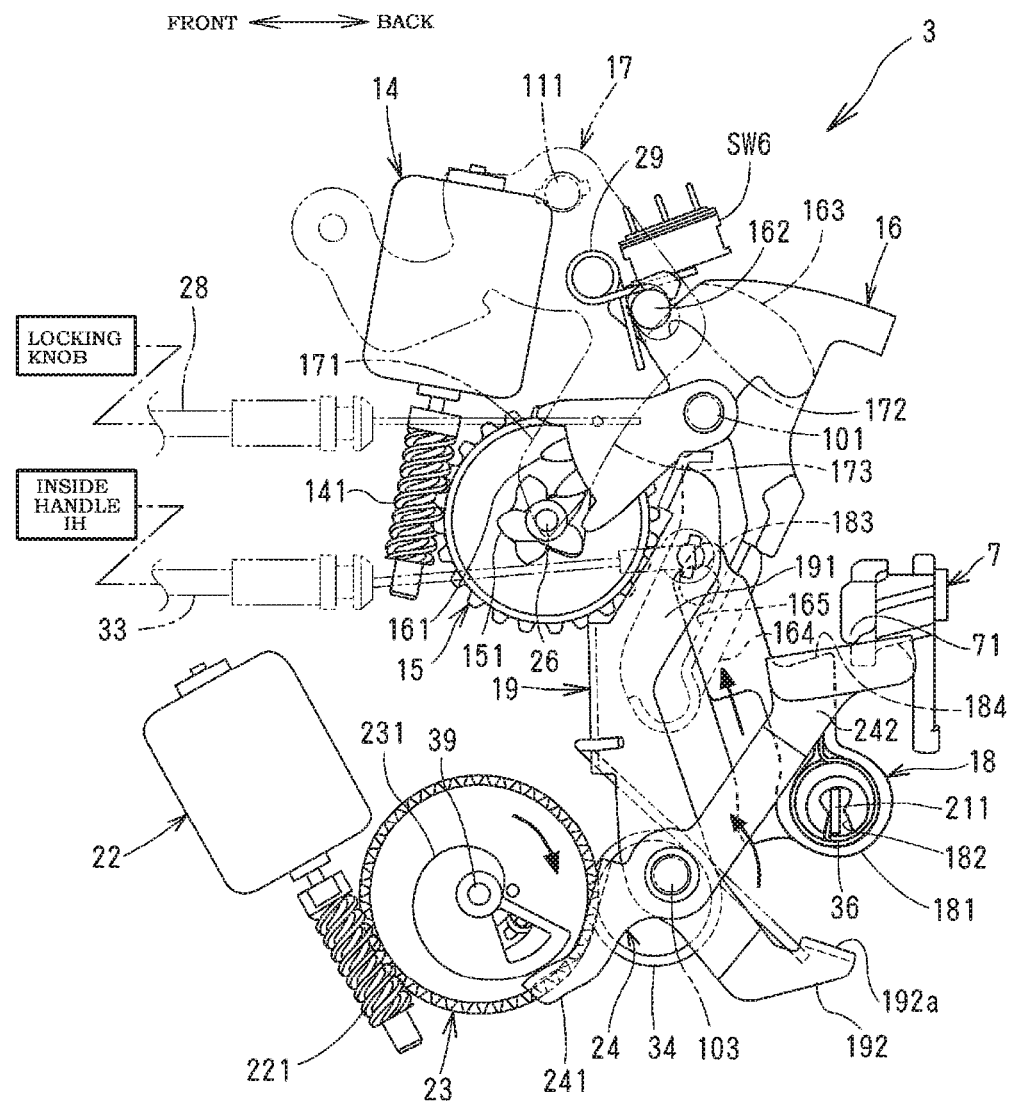
FIG. 9 is a side view of the main part that is electrically released by door-opening action of the outside handle.
Figure 10:
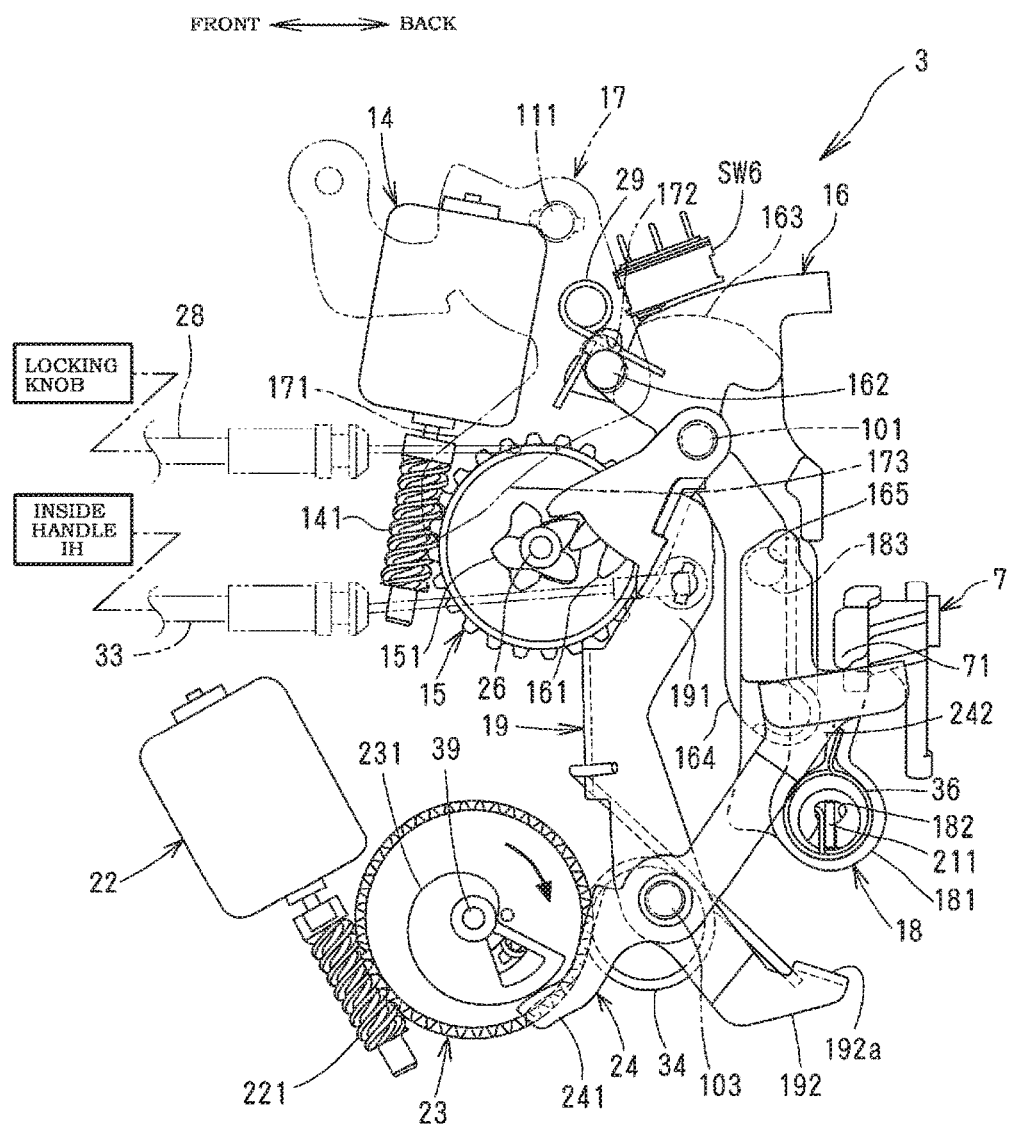
FIG. 10 is a side view of the main part that is unlocked simultaneously with or right before and after electric releasing at door-opening action of the outside handle.

In FIG. 10 following FIG. 9, the open link 18 moves to an unlocking position without generating panic state in which the open link 18 comes in contact with the opening lever 7 from a direction where the opening lever 7 cannot turn, and the opening lever 7 makes releasing action with the electric release lever 24. Thus, the door can be opened with a single door-opening action of the outside handle OH.

Hence, even if the locking mechanism is changed from the locking state to the unlocking state, simultaneously with or right before and after mechanical action of the outside handle OH, the locking mechanism is changed to the unlocking state without generating a panic state in which the locking mechanism stops just before the unlocking state, and the door can be opened with a single door-opening action of the outside handle OH.

When a signal from the outside transmitter SW4 is authenticated and the locking mechanism is in the unlocking or locking state, the door is tried by the external switch SW1 or portable switch SW5.

ECU receives a door-opening signal from the external switch SW1 or portable switch SW5 and drives the releasing motor 22 to rotate the releasing worm wheel 23 of an opening door (a door operated by the external switch SW1 or a door selected by the portable switch) from the set position in a releasing direction. Thus, regardless of the state of the locking mechanism, the end of the first arm 241 of the electric release lever 24 slides on the cam surface 231 of the releasing worm wheel 23 with rotation of the releasing worm wheel 23 in a releasing direction and rotates from the set position to the releasing position (FIG. 7 in the unlocking state and FIG. 8 in the locking state). The end of the second arm 242 comes in contact with the releasable portion 71 of the opening lever 7 from below. The engagement mechanism is released, so that the door can be opened.

Regardless of the state of the locking mechanism, the electric release lever 24 directly actuates the opening lever 7 to release the engagement. Thus, even if the locking mechanism is in the locking state, the door can be opened swiftly with the releasing motor 22 at a single door-opening action of the external switch SW1 or portable switch SW5.

When a signal from the outside transmitter SW4 is authenticated and the locking mechanism is in the locking state, the door is tried by the external switch SW1 or portable switch SW5, and the locking knob or internal locking switch SW3 is unlocked simultaneously with or right before and after door-opening action by the external switch SW1 or portable switch SW5.

ECU receives a door-opening signal from the external switch SW1 or portable switch SW5 and drives the releasing motor 22 to cause a door to open, while ECU receives an unlocking signal from the internal locking switch SW3 and drives the locking motor 14 for unlocking control. When the locking mechanism is switched from the locking state to the unlocking state by the locking knob manually, the locking motor 14 is not driven.

Thus, the electric release motor 24 is driven for releasing from the set position in FIG. 6 regardless of the state of the locking mechanism. Meanwhile, the locking mechanism is switched from the locking state in FIG. 6 to the unlocking state with the locking motor 14 simultaneously with or right before and after releasing the electric release lever 24. So, in FIG. 7, the electric release lever 24 actuates the opening lever 7 directly for releasing, and the locking mechanism is switched from the locking state to the unlocking state without coming in contact with the opening lever 7. In this case, even if the releasing of the electric release lever 24 overlaps the shift of the locking mechanism from the locking state to the unlocking state, the door can be opened swiftly and the locking mechanism can be switched to the unlocking state securely at a single door-opening action of the external switch SW1 or portable switch SW5 because there is no panic state in which the open link 18 stops right before the unlocking position by coming in contact with the opening lever 7 from an unrotatable direction of the opening lever 7.

One embodiment of the present invention is described, but without departing from the scope of the invention, various modifications and changes can be made as below besides the foregoing embodiment:

(1) The door is a sliding door which opens and closes along the side of the vehicle.

(2) The door is electrically opened and closed by a door opening device having a power source such as a motor. After the engagement mechanism is released at the door-opening action of the electric elements, the door opening device is controlled to move the door to open.

(3) When a door in which a locking mechanism is locked is opened by releasing drive control of the releasing motor 22, the locking motor 14 is controlled for unlocking to change the locking mechanism from the locking state to the unlocking state right after release control of the releasing motor 22, a predetermined time passing after the releasing control finished or when the open door is closed.

(4) The locking motor 14 and/or releasing motor comprises a solenoid.

(5) The outside-handle detecting switch SW7 is disposed close to the outside handle OH and detects door-opening action of the outside handle OH directly.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. A motor vehicle door lock device comprising:
an engagement mechanism that engages with a striker to hold a door closed;
an opening lever that moves in a direction for releasing engagement of the engagement mechanism;
an outside handle on an outer side of the door;
a locking mechanism having an open link capable of being switched to an unlocking state in which the engagement mechanism can be released by the opening lever being able to contact the open link and a locking state in which the engagement mechanism cannot be released by the opening lever being unable to contact the open link wherein the open link is actuated based on a door-opening action of the outside handle;
a locking motor that switches the locking mechanism to the unlocking state and the locking state;
an electric release mechanism that can release engagement of the engagement mechanism by actuating the opening lever regardless of the unlocking state or the locking state of the locking mechanism;
a releasing motor that actuates the electric release mechanism to release the engagement of the engagement mechanism;
a detecting switch that detects the door-opening action of the outside handle;
a transmitter that transmits a predetermined signal;
an authenticating portion that can authenticate the predetermined signal from the transmitter; and
a control that drives and controls the releasing motor,
wherein when the authenticating portion authenticates the predetermined signal from the transmitter and the locking mechanism starts switching from the locking state to the unlocking state of the locking mechanism by the locking motor simultaneously with the door-opening action of the outside handle, in order to prevent a panic state in which the open link stops right before an unlocking position by coming in contact with the opening lever from an unrotatable direction of the opening lever, the control controls the releasing motor to releasably actuate the electric release mechanism based on detection of the door-opening action of the outside handle with the detecting switch, and
as a result, the open link of the locking mechanism is actuated upon a door-opening action of the outside handle in the locking state, and switches to the unlocking state by driving of the locking motor without contacting the opening lever actuated by the releasing motor from a direction where the opening lever does not actuate.

2. The motor vehicle door lock device of claim 1 wherein when the locking mechanism is in the locking state and the authenticating portion does not authenticate the predetermined signal from the transmitter, the control does not control the releasing motor even if the detecting switch detects the door-opening action of the outside handle.

* * * * *